United States Patent
Center

(10) Patent No.: US 6,899,093 B2
(45) Date of Patent: May 31, 2005

(54) CONTROL SYSTEM FOR NOX CONTROL FOR CAM PHASER AND/OR EGR SYSTEMS

(75) Inventor: Marc Bryan Center, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,291

(22) Filed: Sep. 17, 2003

(65) Prior Publication Data

US 2005/0056265 A1 Mar. 17, 2005

(51) Int. Cl.⁷ .......................... F02D 41/14; F02M 25/07
(52) U.S. Cl. .................. 123/681; 123/698; 123/568.16; 701/109
(58) Field of Search ............... 123/672, 679, 123/681, 682, 683, 698, 568.16, 568.21, 90.15, 90.16, 90.17, 568.14, 690; 73/117.3, 118.1; 701/108, 109

(56) References Cited

U.S. PATENT DOCUMENTS

| | | | | |
|---|---|---|---|---|
| 4,399,791 A | * | 8/1983 | Kobayashi et al. | 123/698 |
| 4,471,745 A | * | 9/1984 | Yoshioka et al. | 123/698 |
| 4,794,903 A | * | 1/1989 | Suzuki | 123/698 |
| 5,060,604 A | * | 10/1991 | Seki et al. | 123/90.16 |
| 5,150,694 A | * | 9/1992 | Currie et al. | 123/698 |
| 6,378,515 B1 | * | 4/2002 | Geyer | 123/683 |
| 6,615,646 B2 | * | 9/2003 | Schell | 73/118.1 |
| 6,666,201 B1 | * | 12/2003 | Mazur | 123/698 |

FOREIGN PATENT DOCUMENTS

JP 2001-295686 A * 10/2001

* cited by examiner

Primary Examiner—Willis R. Wolfe, Jr.
(74) Attorney, Agent, or Firm—Christopher DeVries

(57) ABSTRACT

A vehicle control system regulates oxides of nitrogen levels in vehicle emissions. Recirculation of exhaust gas in an engine is controlled with an exhaust gas regulator valve and/or a cam phaser. An oxides of nitrogen sensor determines the level of oxides of nitrogen levels in the exhaust gas and communicates the information to a vehicle controller. The controller determines if the oxides of nitrogen levels are within a predetermined threshold according to a lookup table. The controller adjusts the valve and/or cam phaser if the oxides of nitrogen levels are not within the threshold.

21 Claims, 4 Drawing Sheets

CONTROL SYSTEM FOR NOX CONTROL FOR CAM PHASER AND/OR EGR SYSTEMS

FIELD OF THE INVENTION

The present invention relates to emissions control systems for vehicles, and more particularly to emissions control systems that reduce oxides of nitrogen in vehicle emissions.

BACKGROUND OF THE INVENTION

Vehicle engines produce oxides of nitrogen (NOx) as a component of vehicle emissions. In particular, lean-burn gasoline and diesel engines tend to produce higher levels of NOx than conventional gasoline engines.

In an effort to reduce NOx levels in vehicle emissions, manufacturers employ emissions control systems with engine sensors and NOx storage catalysts. The NOx storage catalysts absorb and decompose the NOx with combustible gases such as carbon monoxide (CO) or hydrocarbon (HC). While reducing NOx levels, these systems tend to increase the level of hydrocarbons in vehicle emissions.

Recent designs in NOx sensors allow improved reduction of NOx emissions. NOx sensors may be integrated in the NOx storage catalyst. The NOx sensor detects NOx concentrations in emissions. The sensor communicates with an engine control system and provides data regarding NOx levels. The engine control system takes actions to reduce the NOx levels.

SUMMARY OF THE INVENTION

A control system regulates vehicle emissions with a valve that controls recirculation of exhaust gas in an engine. A sensor communicates with the exhaust gas to measure oxides of nitrogen levels in the exhaust gas. A controller communicates with the sensor and the valve. The processor adjusts the valve if the oxides of nitrogen levels are not within a threshold.

In another feature of the invention, a control system regulates vehicle emissions with a cam phaser that controls recirculation of exhaust gas in an engine. A sensor communicates with the exhaust gas to measure oxides of nitrogen levels in the exhaust gas. A controller communicates with the sensor and the cam phaser. The processor adjusts the cam phaser if the oxides of nitrogen levels are not within a threshold.

In another feature of the invention, a calibration map is generated on the controller. The calibration map is a predetermined lookup table that determines the threshold based on an accelerator position and an engine speed. The processor adjusts the valve and/or cam phaser according to the lookup table.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
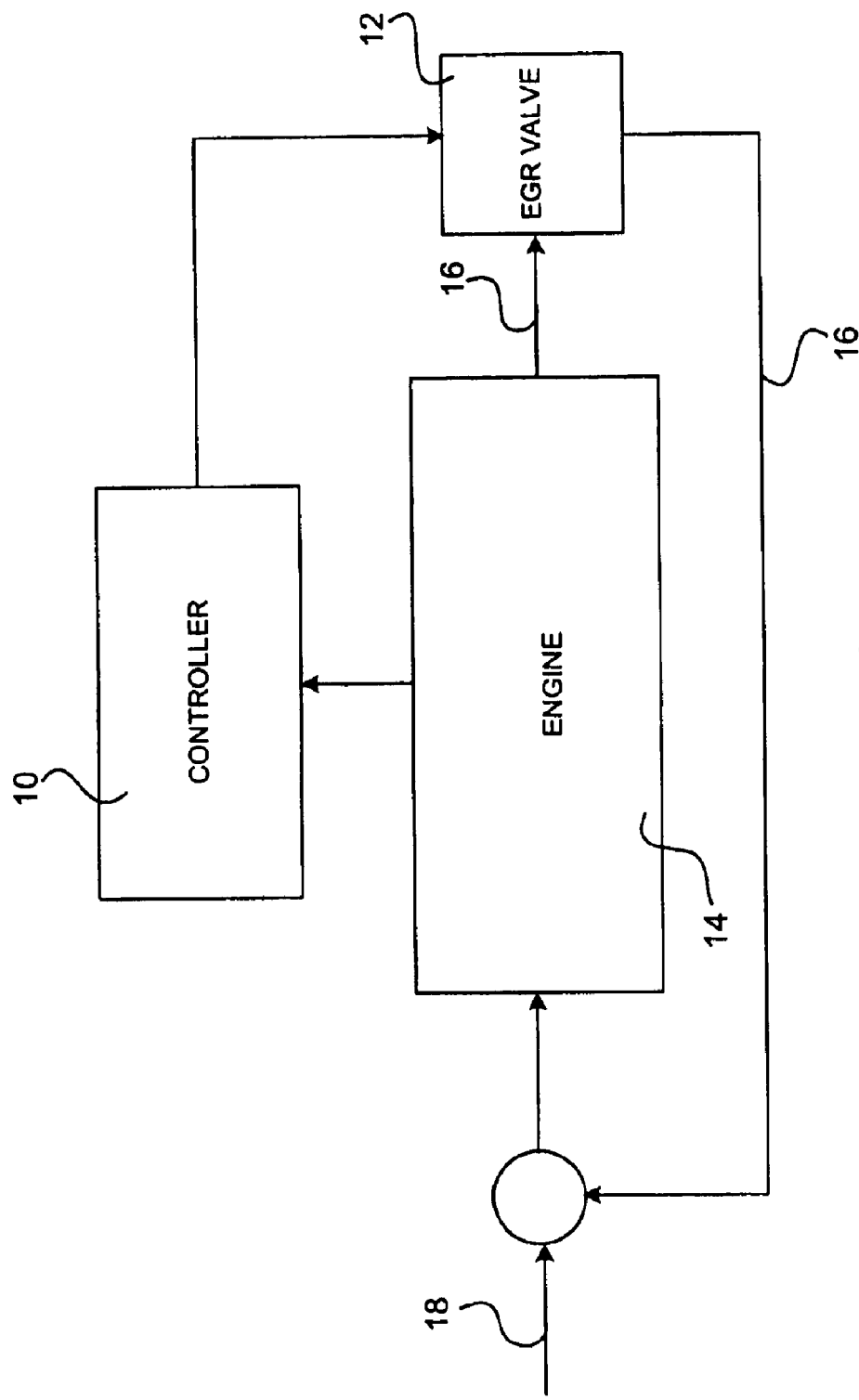
FIG. 1A is a block diagram of an engine control system providing exhaust gas recirculation using an exhaust gas recirculation (EGR) valve according to prior art.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1A, an engine controller 10 monitors and adjusts engine performance based on various input signals. For example, the controller 10 may modulate an exhaust gas recirculation (EGR) valve 12 to reduce NOx emissions. Higher combustion temperatures in the engine 14 increase levels of NOx emissions in exhaust gas 16. Directing some of the exhaust gas 16 back into the engine 14 with intake air 18 reduces the combustion temperatures. The EGR valve 12 meters the amount of exhaust gas 16 that is recirculated with the intake air 18. The recirculated exhaust gases lower the combustion temperatures, which reduces NOx emissions. The calculation of the valve position for the EGR valve 12 is estimated based on engine conditions such as engine speed and desired air per cylinder. The valve position calculation is not directly related to the actual NOx level.

Figure 1B:
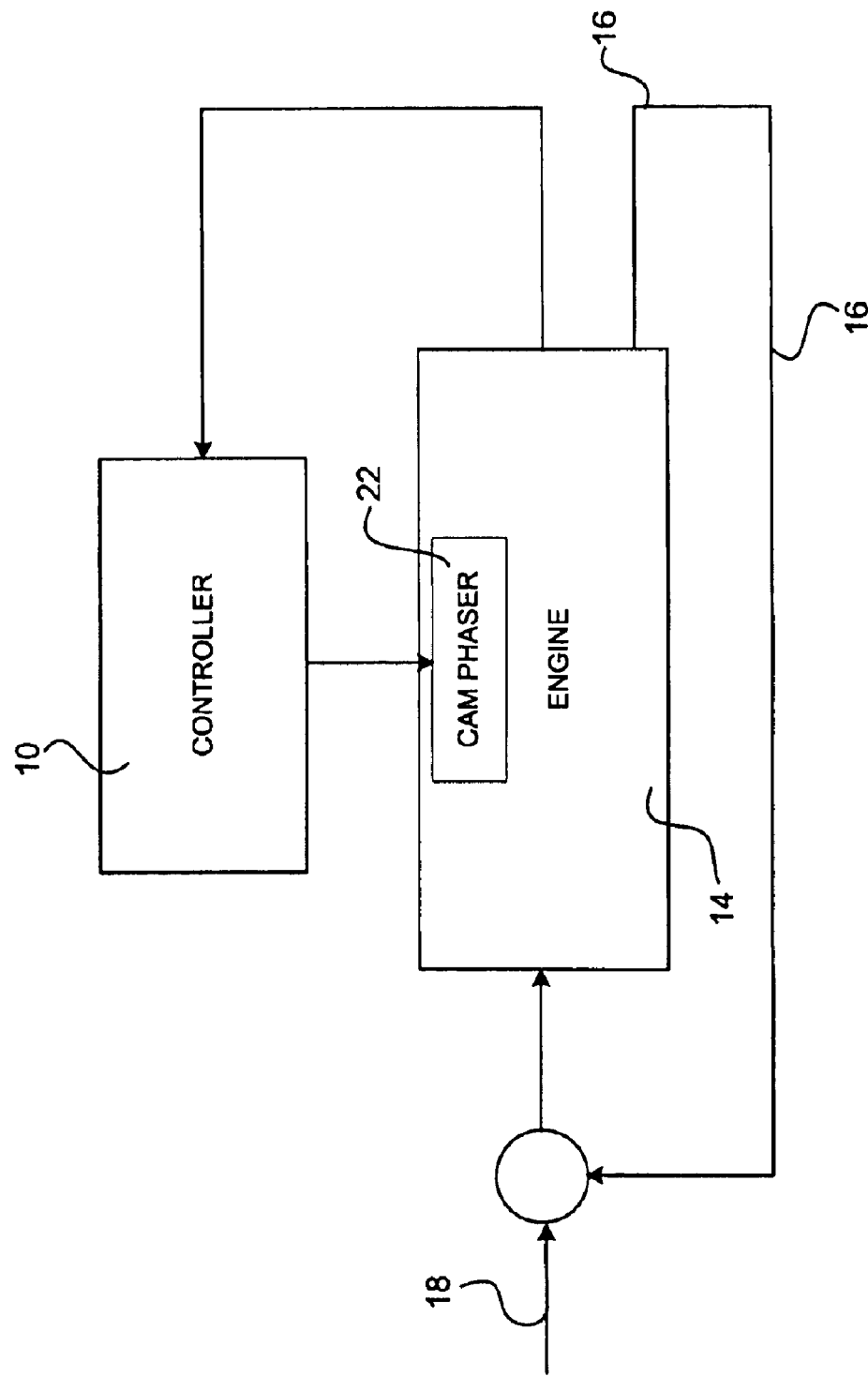
FIG. 1B is a block diagram of an engine control system providing exhaust gas recirculation using a cam phaser according to prior art.

Alternatively, a cam phaser 22 may be incorporated with the engine 14 to reduce NOx emissions, as shown in FIG. 1B. The cam phaser 22 changes a phase of a camshaft in the engine 14, which draws the exhaust gas 16 back into the engine 14. The cam phaser 22 simulates the function of an EGR system by reintroducing the exhaust gas 16 into the engine 14, which reduces the combustion temperature and NOx emissions. The controller 10 manages phase settings of the cam phaser 22. As with an EGR system, the phase setting of the cam phaser 22 is an estimation that is derived from engine conditions and is not directly related to the actual NOx level.

Figure 2:
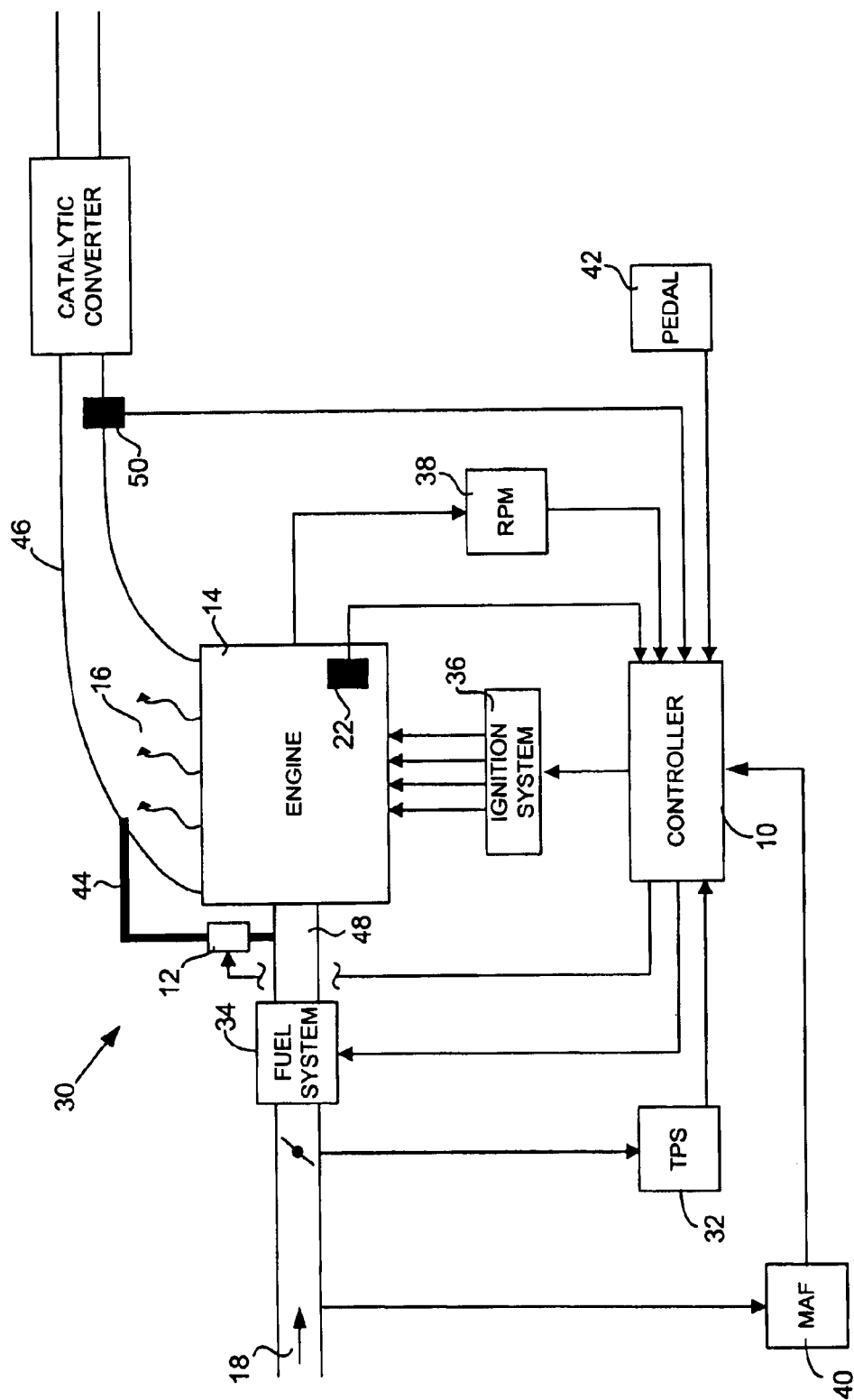
FIG. 2 is a block diagram of an engine control system including a NOx sensor.

Referring now to FIG. 2, an engine control system 30 is shown. The controller 10 communicates with various components of the engine control system 30, including but not limited to a throttle position sensor 32 (TPS), a fuel system 34, an ignition system 36, and the engine speed sensor 34 (RPM). The controller 10 receives a mass airflow from the MAF 40 and uses the information to determine airflow into the engine 14. The airflow data is then used to calculate fuel delivery from the fuel system 34 to the engine 14. The controller 10 further communicates with the ignition system 18 to determine ignition spark timing. The controller 10 may receive additional inputs from other components in the engine control system 8, including a mass airflow sensor (MAF) 40 and an accelerator pedal 42.

In an EGR system, a conduit 44 connects the exhaust manifold 46 to the intake manifold 48. The EGR valve 12 that is positioned along the conduit 44 meters EGR according to input from the controller 10. Alternatively, the cam phaser 22 operates according to input from the controller 10 to simulate an EGR system. In the preferred embodiment, a NOx sensor 50 measures NOx levels and communicates the data to the controller 10. The controller 10 may communicate with the EGR valve 12 or the cam phaser 22 in response to the data from the NOx sensor 50. The controller 10 adjusts the EGR valve 12 and/or the cam phaser 22 to correct performance thereof. For example, the controller 10 selectively adjusts the EGR valve 12 or the cam phaser 22 to meter the exhaust gas directed back into the engine.

Figure 3:
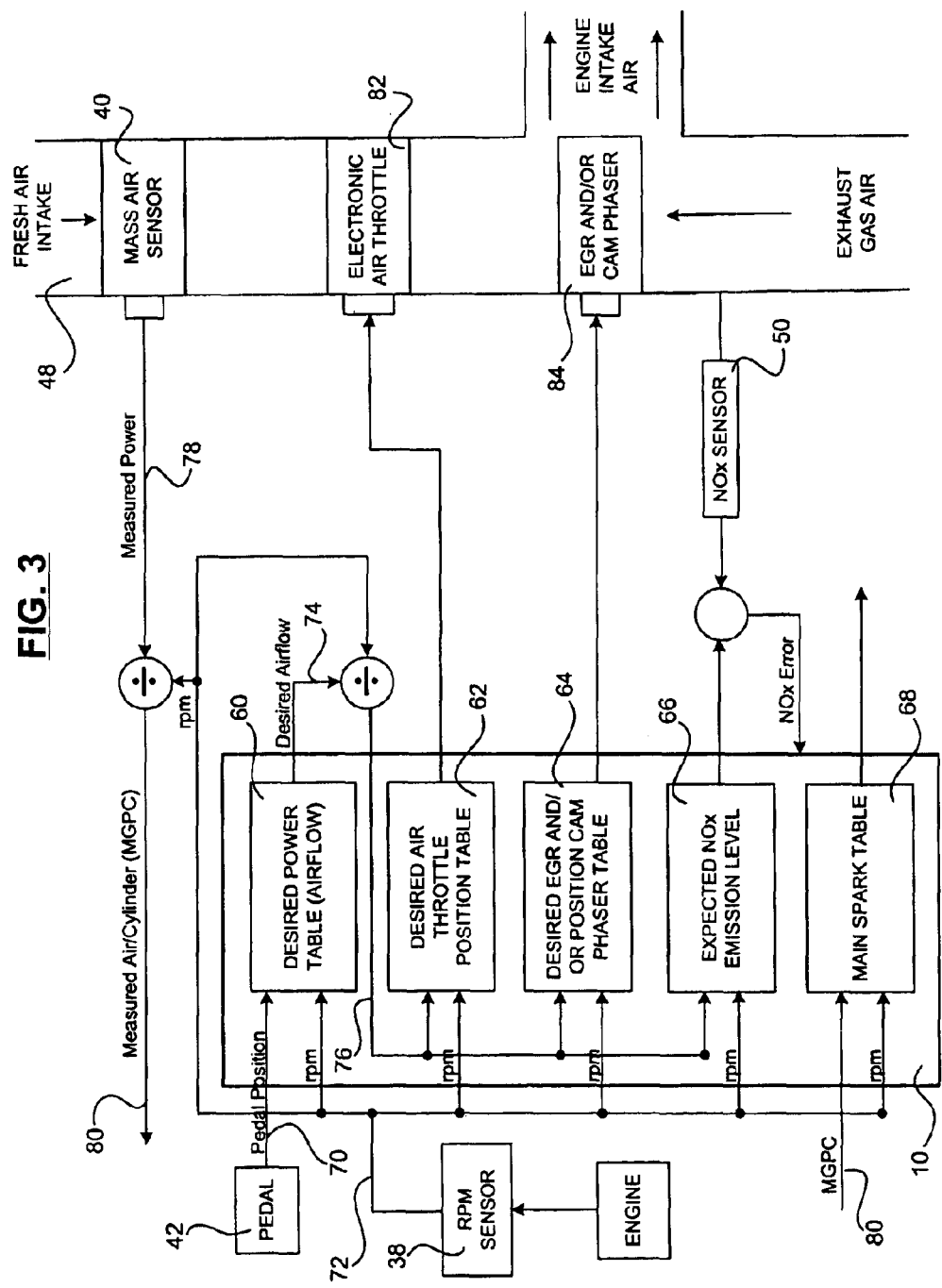
FIG. 3 is a block diagram of an engine control system according to the present invention.

Referring now to FIG. 3, the controller 10 manages data tables such as a desired power table 60, a desired air throttle position table 62, a desired EGR/cam phaser position table 64, an expected NOx emission level 66, and a main spark table 68. These tables determine the parameters for various engine operations using predetermined lookup tables, as will be described below.

The desired power table 60 calculates desired airflow into the engine. Inputs for the desired power table 60 include an accelerator pedal position signal 70 from the accelerator pedal 42 and an rpm signal 72 from the engine speed sensor 38. A desired airflow signal 74 is divided by the rpm signal 72 to determine a desired air per cylinder signal 76. The desired air per cylinder signal 76 and the rpm signal 72 are inputs for the desired air throttle position table 62, the desired EGR/cam phaser position table 64, and the expected NOx emission level table 66.

The mass airflow sensor 40 outputs a measured power signal 78. The measured power signal 78 is divided by the rpm signal 72 to determine a measured air per cylinder signal 80. The rpm signal 72 and the measured air per cylinder signal 80 are inputs for the main spark table 68.

The desired air throttle position table 62 determines a position of a throttle 82 based on the desired air per cylinder 76 and rpm 72 input signals. The throttle 82 controls the amount of air input to the engine. The desired EGR and/or cam phaser table 64 adjusts an EGR and/or cam phaser actuator position based on the input signals.

Still referring to FIG. 3, the expected NOx emission level 66 is a calibration map that generates target levels for NOx emissions according to various vehicle conditions. The target NOx level from the calibration map is compared to a measured NOx emission level from the NOx sensor 50 to determine a NOx error. The NOx error is communicated to the controller 10 whereby the NOx error may be used for control purposes such as diagnoses and remedial action. For example, the calibration map may specify a preferred range for NOx error. If the NOx error is outside the specified range, the controller 10 adjusts an EGR valve or cam phaser actuator 84 to compensate for the NOx error.

Alternatively, the controller 10 may communicate with the desired power table 60, the desired air throttle position table 62, or the main spark table 68 to make adjustments in response to the NOx error. For example, the controller 10 may alter the main spark table 68 to adjust spark timing to optimize combustion, further affecting NOx levels. Additionally, the controller 10 may alter the desired air throttle position table 62 to adjust the flow of intake air.

The controller 10 may also diagnose the performance of the actuator 84. If the NOx error is outside of the range specified by the calibration map, the controller 10 may determine that the actuator 70 is malfunctioning. For example, the controller 10 may observe that the NOx error remains outside of the specified range despite remedial action taken by the controller 10 and the various data tables. In this situation, the controller 10 flags the actuator as faulty and in need of maintenance.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for regulating vehicle emissions comprising:
   a valve that controls recirculation of exhaust gas in an engine;
   a sensor that communicates with the exhaust gas to measure an oxides of nitrogen levels;
   a controller that communicates with the sensor and the valve, that determines an expected oxides of nitrogen level based on a desired air per cylinder (APC) and that adjusts the valve if a difference between the expected oxides of nitrogen level and the oxides of nitrogen level is not within a threshold.

2. The control system of claim 1 wherein the threshold is determined by a calibration map generated on the controller.

3. The control system of claim 2 wherein the calibration map is a predetermined lookup table.

4. The control system of claim 3 wherein the controller adjusts the valve according to the lookup table.

5. The control system of claim 3 wherein the lookup table determines the threshold based on an accelerator pedal position and an engine speed.

6. The control system of claim 1 wherein the controller diagnoses valve malfunctions based on the oxides of nitrogen levels.

7. The control system of claim 5 wherein the controller diagnoses valve malfunctions if the oxides of nitrogen levels are not within a threshold for a period.

8. The control system of claim 4 wherein the controller diagnoses valve malfunctions if the oxides of nitrogen levels are not within a threshold after the contoller adjusts valve performance.

9. A control system for regulating vehicle emissions comprising:
   a cam phaser that controls a position of a camshaft, wherein the position affects exhaust gas in an engine;
   a sensor that communicates with the exhaust gas to measure oxides of nitrogen levels;
   a controller that communicates with the sensor and the cam phaser that determines an expected oxides of nitrogen level based on a desired air per cylinder (APC) and that adjusts the cam phaser if a difference between the expected oxides of nitrogen level and the oxides of nitrogen level is not within a threshold.

10. The control system of claim 9 wherein the threshold is determined by a calibration map generated by the controller.

11. The control system of claim 10 wherein the calibration map is a predetermined lookup table.

12. The control system of claim 11 wherein the controller processor adjusts the cam phaser according to the lookup table.

13. The control system of claim 11 wherein the lookup table determines the threshold based on an accelerator pedal position and an engine speed.

14. The control system of claim 9 wherein the controller diagnoses cam phaser malfunctions based on the oxides of nitrogen levels.

15. The control system of claim 14 wherein the controller diagnoses cam phaser malfunctions if the oxides of nitrogen levels are not within a threshold for a period.

16. The control system of claim 14 wherein the controller diagnoses cam phaser malfunctions if the oxides of nitrogen levels are not within a threshold after the controller adjusts cam phaser performance.

17. A method for reducing NOx levels in vehicle emissions comprising:

measuring NOx levels in exhaust gas in an engine;

controlling exhaust gas recirculation in an engine;

calculating an expected NOx level based on a desired air per cylinder (APC); and communicating the NOx levels to a controller wherein the controller adjusts the exhaust gas recirculation in the engine if a difference between the expected NOx level and the NOx levels exceeds a threshold.

18. The method according to claim 17 further comprising:

generating a calibration map at the controller; and determining a threshold at the calibration map.

19. The method according to claim 17 wherein the controller adjusts the exhaust gas recirculation in the engine if the NOx levels exceed the threshold for a period.

20. The method according to claim 18 wherein the controller adjusts the exhaust gas recirculation according to the calibration map.

21. The method according to claim 20 further comprising determining the threshold based on an accelerator pedal position and an engine speed.

* * * * *